March 10, 1959     S. BENOWITZ     2,877,456
ZERO SPEED DETECTOR

Filed Sept. 26, 1956     2 Sheets-Sheet 1

INVENTOR.
SANDER BENOWITZ
BY Wade Koontz
ATTORNEY
Richard J. Killoren and
AGENT

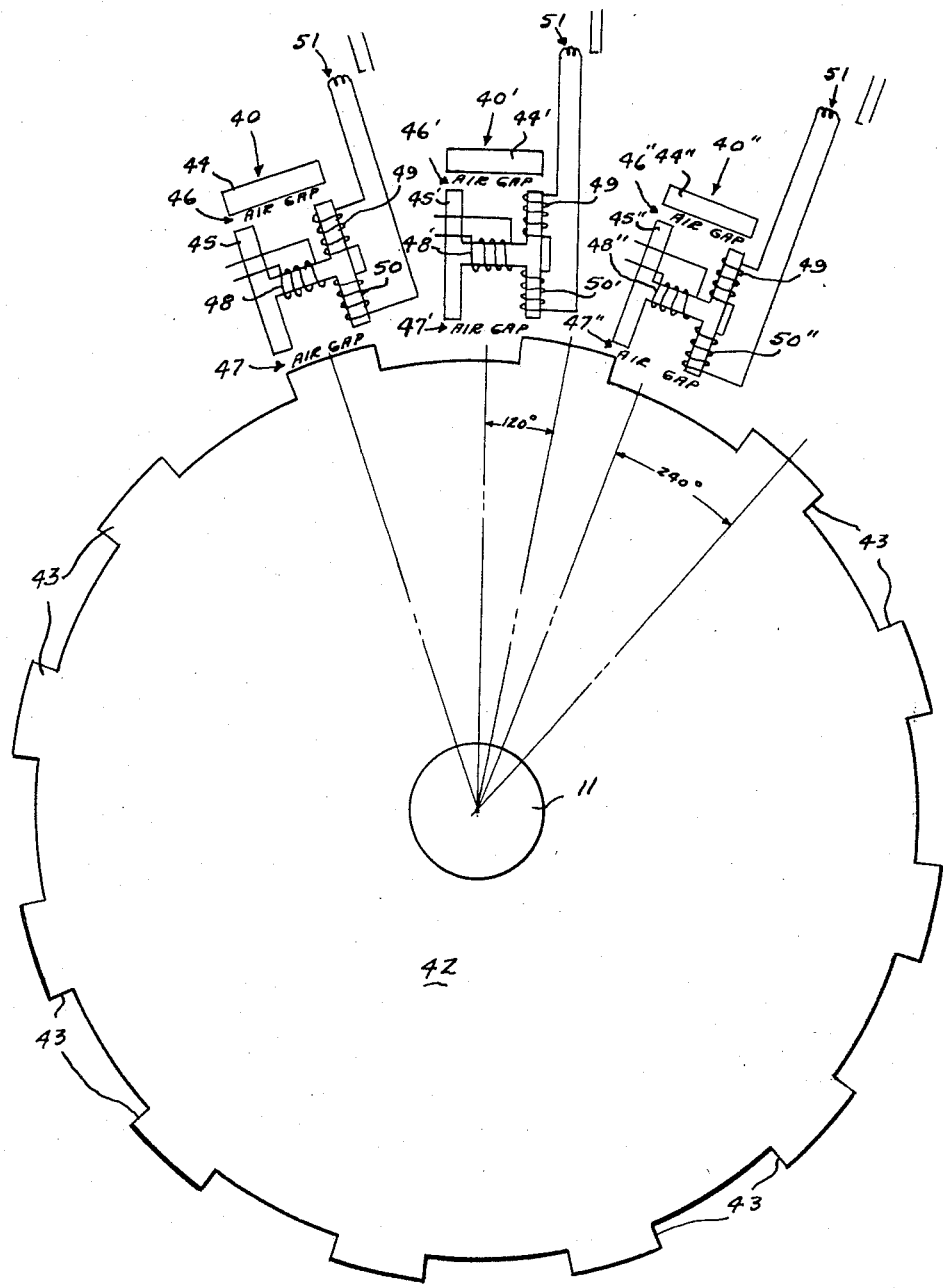

United States Patent Office 2,877,456
Patented Mar. 10, 1959

2,877,456

ZERO SPEED DETECTOR

Sander Benowitz, Mountain View, Calif., assignor, by mesne assignments, to the United States of America as represented by the Secretary of the Air Force Application September 26, 1956, Serial No. 612,344

3 Claims. (Cl. 340—271)

This invention relates to a zero speed detector to determine whether an object, such as a rotating shaft, has ceased all motion and is at rest.

Another object is a provide a device which will give an indication at a point remote from an object, such as a shaft, whether said object has ceased all motion and is at rest.

Another object is to provide a device which will determine when the speed, of a compressor shaft for a wind tunnel is at zero or near zero.

A further object is to provide a device that will perfor a definite function, such as controlling the coupling or uncoupling of a compressor for a wind tunnel.

A still further object is to provide a device to determine whether an object, which may have either rotary or straight line motion, has reached zero speed or is near zero speed.

These above objects are accomplished by providing a sensing device and a measuring element. The sensing device may be either a standard synchro-tie transmitter, which is driven by the shaft or a plurality of differential transformers, while the measuring element may consist of either a plurality of indicating lamps or a plurality of standard over-voltage relays.

When used with a compressor shaft for a wind tunnel the indicating elements may be located on an operator's panel at a place remote from the compressor.

The standard synchro-tie transmitter has a rotor with one winding which is excited with single phase alternating current and three stator windings which are spaced 120 degrees apart and brought out to three terminals. When at standstill, single phase from the rotor is induced by transformer action into the stator windings. Since the rotor can have any position the stator winding voltages will depend on the relative position of the rotor with respect to the stator. A simple indicator consists of three indicating lamps connected to the terminals of the synchro-tie transmitter. The three lamps will be lighted to varying degrees of illumination depending upon the position of the rotor with respect to the stator windings. As the rotor moves the lamps will change in intensity of illumination and a change in intensity of the light will indicate rotation of the shaft whereas when the change in intensity stops, zero speed for the shaft is indicated. By observing the relative intensity of the lamps it is possible to detect very minute changes in position of the shaft.

Lamp systems provide only a visual indication for zero speed and therefore are not satisfactory for all applications. When a measuring device is required that will perform a definite function, such as controlling the coupling or uncoupling a compressor for a wind tunnel, over-voltage relays are connected across the three synchro-tie transmitter terminals. These are standard relays which close their contacts at or above a definite voltage setting. The relays can be set to close their contacts within a definite time delay period. Therefore the relays can be set so that the shaft must move at a very slow speed before any of the relays can close their contacts.

While the device using the synchro-tie transmitter is applicable in many cases it is not suitable where temperatures in the order of 600° F. are anticipated nor where the motion being checked is straight line motion. A device which is capable of more general use is a system which uses a plurality of differential transformers. In the case where the object is a shaft, a disk with a plurality of projections of magnetic material is mounted on the end of the shaft. The differential transformers are mounted adjacent the disk. The differential transformers have a primary winding on one leg and two secondary windings, wound in opposition on two other legs. A fixed element of magnetic material is located adjacent the transformer core so as to provide a constant length air gap in the magnetic circuit through one of the secondary windings. The projections on the disk acts as a means to provide a variable gap length in the magnetic circuit through the other of the secondary windings. As the disk rotates the projections will enter and leave the magnetic path causing an unbalance in the magnetic circuits, thereby causing a difference in the induced voltage in the two secondary windings. By proper shaping of the air gap the envelope of the induced voltage can be made to follow a sine wave. By spacing the differential transformers 120 electrical degrees apart the envelopes for the voltages will be similar to those for the synchro-tie system. The measuring elements may therefore be the same as for the synchro-tie transmitter system.

In the drawings:

Figure 4 shows a schematic diagram of another embodiment wherein differential transformers are used as the sensing device.

Figure 1:
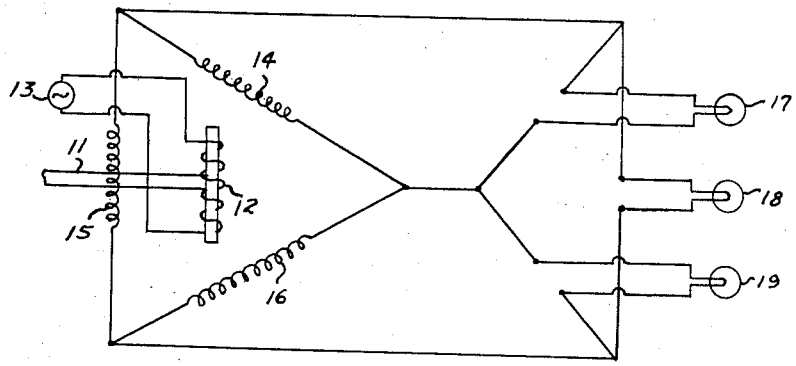
Figure 1 is a schematic wiring diagram illustrating the arrangement and connection of the various elements in one embodiment of the invention.

Referring more particularly to Figure 1 the reference numeral 11 refers to a shaft whose speed is being measured. A rotor winding 12 is coupled to the shaft 11 either directly or through reduction gearing, which will be explained in greater detail in connection with Figure 2. An alternating current source 13 is connected to the rotor winding 12. Three stator windings 14, 15 and 16 are spaced 120 degrees apart around the rotor winding and are located in electromagnetic energy coupling relation with said rotor windings. Three indicating lamps 17, 18 and 19 are connected across the stator windings 14, 15 and 16 respectively.

Figure 3:
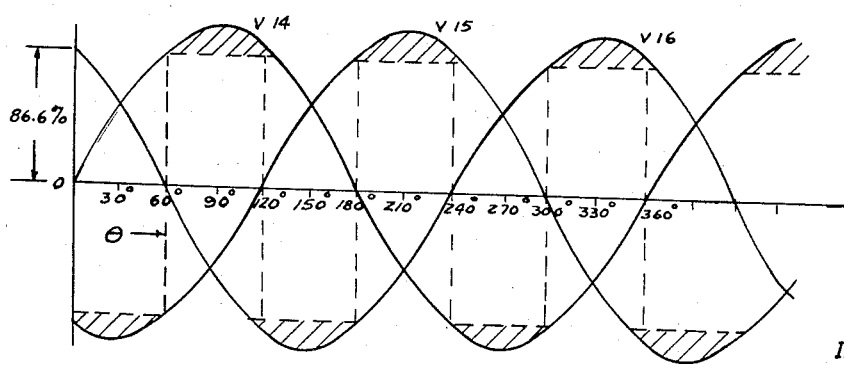
Figure 3 shows the curves for the envelopes of the voltages induced in the three stator windings as the rotor moves through various positions.

In the operation of the device of Figure 1 the rotor winding 12 is driven by the shaft 11, for which a zero speed indication is desired. The rotor is energized by an alternating current source 13. As the rotor winding is rotated through various positions the induced voltages in the three stator windings follow the curves as shown in Figure 3. These voltages are impressed across the lamps 17, 18 and 19. Since the induced voltages in windings 14, 15 and 16 will change as the rotor winding rotates the intensity of the illumination of the lamps will vary. Since the human eye will detect very small changes in intensity of illumination, particularly if clear bulb type of incandescent lamps are used, it is possible to detect very minute changes in position or creeping of the shaft.

Figure 2:
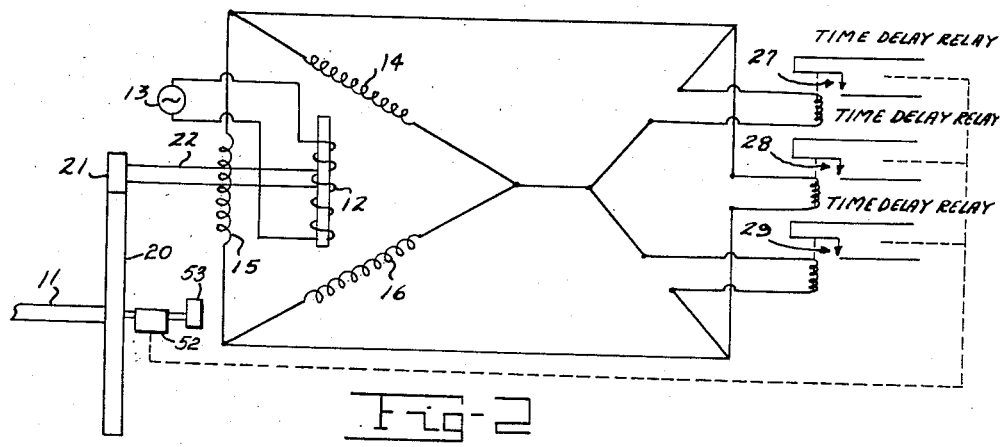
Figure 2 is a schematic wiring diagram of another embodiment wherein over-voltage relays have been substituted for the indicating lamps.

The device of Figure 2 is similar to the device of Figure 1 but has three over-voltage relays 27, 28 and 29 substituted for the indicating lamps 17, 18 and 19. Like elements have been given the same reference numerals in both figures. In Figure 2 the rotor winding 12 is shown as coupled to the shaft 11 through a reduction gearing system 20 and 21 and a second shaft 22. If the accuracy is not great enough with the rotor winding coupled directly to the shaft as in Figure 1, the accuracy can be increased either by using a multi-pole synchro-tie transmitter or by the use of reduction gearing as shown. The circuits controlled by the time delay relays 27, 28 and 29 may be used to control the connection of coupling number 52 to thereby control the operation of compressor number 53.

The gearing system can be friction gearing or other known type of gearing. The relays can be set so that their contacts close at a voltage which is slightly below 86.6% of the maximum stator terminal voltages. Then a relay will be closed for the portion of the curves shown by the shaded portion in Figure 3. Figure 3 shows that the shaded portions of the curves overlap for all values of $\theta$. Therefore if $\theta$ has a fixed value corresponding to the position where the rotor stops, there will always be a corresponding shaded area for which one of the three relays will close. Since the closing time of the relays can be made adjustable it can be made sufficiently long so that none of the relays will close until the shaft reaches a very slow speed.

In the explanation of the operation of the device of Figure 2, it will be assumed that the rotor is stopped at $\theta$ equal to 30 degrees with the voltages induced in the stator windings being as shown in Figure 3 for this value of $\theta$. It can be seen then that relay 28 will be energized. As the rotor starts to turn in a counter-clockwise direction the voltage will decrease in winding 15 and increase in winding 14 until $\theta$ equals 60 degrees at which time relay 28 will open its contacts and relay 27 will start to close its contacts. If the speed of the shaft is great enough by this time the rotor will turn to the point where $\theta$ is equal to 120 degrees before the contacts for relay 27 can become completely closed. Thereafter none of the relays will close their contacts until the speed of the shaft is again reduced to the point where the time taken for the rotor to rotate through 60 degrees is greater than the closing time for the relays.

Though the reduction gearing is shown in connection with the device of Figure 2 it is obvious that it could also be used with the device of Figure 1. It is also obvious that the indicating lamps and relays could be used at the same time.

The device of Figure 4 uses a plurality of differential transformers as the sensing element. These can be used for indicating the speed of an object which has either straight line motion or rotary motion. In the device of this figure they indicate the speed of an object which has rotary motion, such as a shaft 11. A disk 42, having a plurality of projections 43 of magnetic material thereon, is mounted on the end of the shaft 11. A plurality of differential transformers 40, 40' and 40" are located adjacent the disk. Stationary armatures 44, 44' and 44" are located adjacent but spaced from said disk. Cores 45, 45' and 45" of said transformers are located between said stationary armatures and said disk so as to form air gaps 46, 46' and 46" between the cores and the stationary armatures and gaps 47, 47' and 47" between the cores and the disk. Cores 45, 45' and 45" have primary windings 48, 48' and 48" on one leg and secondary winding 49, 50, 49', 50' and 49", 50" respectively wound on two other legs. The windings 49, 49' and 49" are wound in opposition to the windings 50, 50', 50". The outputs of the secondaries are connected to relays 51, 51' and 51". It is obvious that indicating lamps such as those of Figure 1 could also be used.

In the operation of the device of Figure 4 it can be seen that since armature 44 is stationary and core 45 is stationary the air gap 46 will remain constant. It can also be seen that the air gap 47 will change as the disk 42 rotates. With the projection 43 located adjacent transformer 40 as shown the air gaps in the two magnetic circuits through the two secondary windings 49 and 50 will be equal and the output voltage across the two secondary windings will be zero. As the disk rotates the projections will enter and leave the magnetic path, thereby changing the air gap length in one of the magnetic circuits of the transformer so that the voltages induced in the two secondaries will not cancel each other. With proper shaping of the air gaps the envelope of the voltage can be made to follow a sine wave. With transformers 40, 40' and 40" spaced 120 electrical degrees apart the envelopes for the voltages will be similar to those shown in Figure 3. The measuring element will operate in the same manner as explained in the operation of the devices of Figures 1 and 2.

There is thus provided an accurate device for indicating when the speed of an object, such as a rotating shaft, decreases to zero or very near zero.

While certain embodiments of the invention have been described in some detail, it will be understood that numerous changes may be made without departing from the general principles and scope of the invention.

What is claimed is:

1. A device responsive to the motion of an object comprising; a plurality of differential transformers located adjacent said object and each having a primary winding and two secondary windings wound in opposition thereon, an alternating current source connected to said primary windings, means coupled to said object for varying the coupling between the primary winding and one of said secondary windings of each transformer to generate a plurality of alternating voltages having sinusoidally varying envelopes of equal amplitudes with periods which are equal and proportional to the time required for the object to travel a fixed distance and the phases of which are equally spaced in 360 electrical degrees and a time delay relay connected to each of said secondary windings.

2. A device for controlling the coupling and uncoupling of a compressor from a shaft comprising; three differential transformers located adjacent said shaft and each having a primary winding and two secondary windings wound in opposition thereon, an alternating current source connected to said primary windings, means coupled to said shaft for varying the coupling between the primary and one of the secondary windings of each transformer to generate three alternating voltages having sinusoidally varying envelopes of equal amplitudes with periods which are equal and proportional to the period of rotation of the shaft and the phases of which are spaced 120 electrical degrees apart and means connected to said secondary windings for controlling the coupling and uncoupling of said compressor.

3. A device responsive to the speed of a rotating shaft comprising; three differential transformers located adjacent said shaft and each having a primary winding and two secondary windings wound in opposition thereon, an alternating current source connected to said primary windings, means coupled to said shaft for varying the coupling between the primary and one of the secondary windings of each transformer to generate three alternating voltages having sinusoidally varying envelopes of equal amplitudes with periods which are equal and proportional to the period of rotation of the shaft and the phases of which are spaced 120 electrical degrees apart and a delayed action relay connected to the secondary winding of each transformer, said relays being adjusted to close their contacts at a predetermined voltage below the maximum voltage induced in said secondary windings.

References Cited in the file of this patent

UNITED STATES PATENTS 2,499,116   Simons _____ Feb. 28, 1950